No. 872,836. PATENTED DEC. 3, 1907.
T. J. MELL.
VEHICLE WHEEL.
APPLICATION FILED MAY 17, 1906.
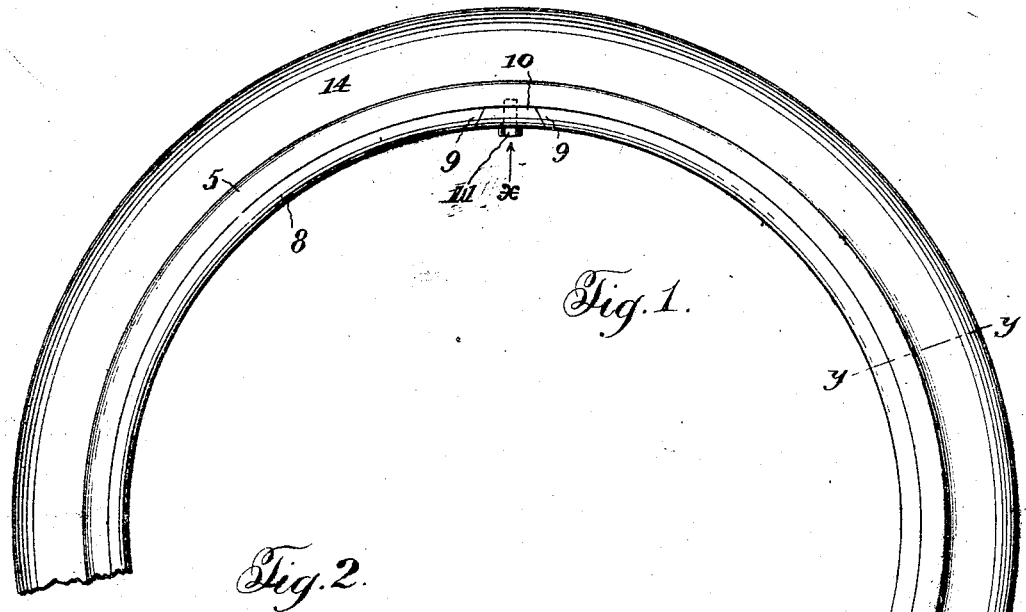
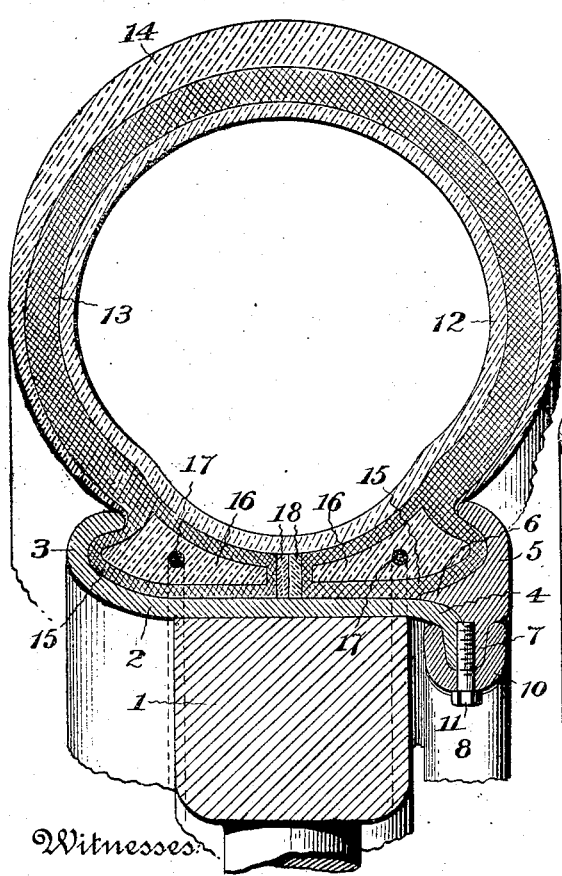
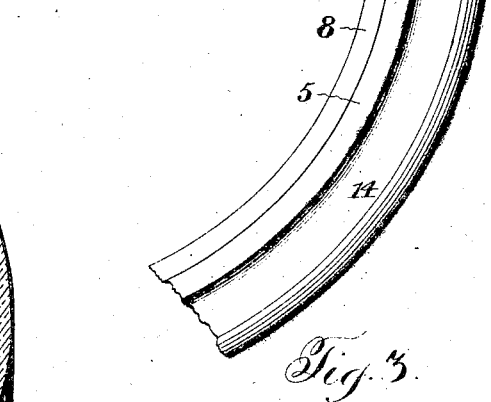
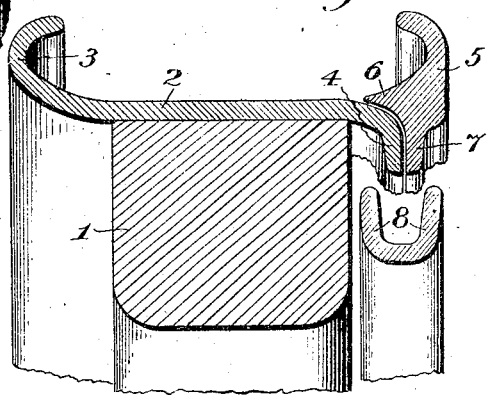
Witnesses:
Jas. E. Hutchinson
Inventor:
Tod J. Mell,
By Wm. O. Dye, Attorney

UNITED STATES PATENT OFFICE.

TOD J. MELL, OF YOUNGSTOWN, OHIO, ASSIGNOR TO THE REPUBLIC RUBBER COMPANY, OF YOUNGSTOWN, OHIO, A CORPORATION OF OHIO.

VEHICLE-WHEEL.

No. 872,836.

Specification of Letters Patent.

Patented Dec. 3, 1907.

Application filed May 17, 1906. Serial No. 317,369.

*To all whom it may concern:*

Be it known that I, TOD J. MELL, a citizen of the United States, residing at Youngstown, in the county of Mahoning and State of Ohio, have invented certain new and useful Improvements in Vehicle-Wheels; and I do hereby declare the following to be a full, clear, and exact description of the invention, such as will enable others skilled in the art to which it appertains to make and use the same.

My present invention relates to vehicle tires and wheel rims for mounting same.

It has for its object the production of a pneumatic tire having certain peculiarities of construction, and also a detachable or separable rim, the latter constructed to receive and securely retain such tires in operative position.

Further objects and purposes of the invention are the prevention of creeping of the tire upon its supporting rim; an effectual sealing of the inner portions of said tire against leakage; ease and facility with which the tire may be removed or replaced; and absolute security of the rim locking means for clamping, compressing and holding the tire to the wheel.

The invention will be hereinafter particularly described and pointed out in the claims following.

In the accompanying drawings which form part of this application and whereon corresponding numerals indicate like parts in the several views: Figure 1 is a fragmentary view in side elevation and upon a small scale, of a pneumatic tire and separable rim embodying my invention, Fig. 2 is a transverse vertical section on the line $x$ Fig. 1, through a wheel felly, separable rim and a pneumatic tire surmounting same in operative relation, and Fig. 3 is a view corresponding with Fig. 2, except that the tire is omitted, the section is taken on the line $y$—$y$, Fig. 1, and the several rim parts are slightly separated.

Reference being had to the drawings and numerals thereon, 1 represents an ordinary wheel felly, to the periphery of which is positively secured the relatively fixed body portion 2 of the rim. This body 2 is curled upon itself at one side to form the usual fixed clencher flange 3, while its other side is curved oppositely to form an inturned annular flange 4 of slightly tapering cross section.

The numeral 5 represents the annular detachable side flange corresponding with, and laterally adjustable with relation to, the fixed flange 3 aforesaid. This detachable flange 5 is provided with an annular shoulder 6 for resting upon the surface of body 2 above its locking flange 4, is formed also with an inturned annular flange 7 corresponding in its configuration with said flange 4 and is adapted to be interlocked therewith by agency of a spring locking ring 8 as shown. This ring 8 is substantially U-shape in cross section with inwardly converging side walls or coöperating inclined faces as shown by Figs. 2 and 3, and at one point in its circumference is broken so that its ends 9, 9 do not ordinarily meet but are separated by a filler block 10 as shown by Fig. 1. The block 10 corresponds in cross section with ring 8, and is retained in position by screw 11 threaded between the locking flanges 4—7 aforesaid, or into a lug formed upon either of them at the proper point or in any other manner.

Between the opposing flanges 3, 5 may be located a pneumatic tire as indicated by Fig. 2, comprising the usual inner tube 12, casing of fabric 13, outer elastic tread 14, and clencher beads 15—15 having tough rubber cores 16—16. Molded into each of the said cores 16—16 are endless non-stretchable cables 17—17; while the adjacent edges of beads 15—15 are provided with unbroken annular soft rubber tips 18—18 as clearly indicated by Fig. 2, and for purposes which will now appear in a statement of use.

The foregoing being a description of my invention in its prefererd form of construction it should be understood that same may be variously altered and rearranged without departing from the spirit thereof, or interfering with the results accomplished.

When constructed as shown the operation of applying a tire is as follows:- Filler block 10 first being removed by withdrawal of screw 11 the ends 9, 9 of locking ring 8 are sprung together, thus reducing the circumference sufficiently to permit its removal over the projecting flanges 4, 7 as indicated by Fig. 3. The detachable side flange 5 is next removed laterally and one of the clencher beads 15 inserted beneath the curved flange 3 of rim body 2, followed by the other clencher bead 15, which in turn is followed by the detachable flange 5. Locking ring 8 is now replaced as it was removed and allowed to expand into the position indicated by Fig. 2, whereupon owing to its oppositely arranged inclined faces coöperating with the correspondingly inclined faces of flanges 4—7 the detachable parts are all drawn positively and snugly together. The soft rubber tips 18—18 are thus compressed so as to snugly cushion the adjacent parts, present a smooth unbroken seat for the inner tube 12 at this point, and at same time guard against all possibility of leakage and consequent deterioration of the fabric and inner linings. This adjustment effected the space between ends 9, 9 of locking ring 8 is next closed by introduction of the channeled filler block 10 as shown by Fig. 1, said block in turn being secured by agency of the single screw 11 returned for the purpose of finally locking all parts in operative relation. Thus it will be particularly observed the resiliency of ring 8 serves not only to interlock the separable rim sections, but owing to its relatively inclined faces automatically draws and jams such sections together placing all parts intermediate of the side clencher flanges 3—5 under compression. Such compression is transmitted naturally to the intermediate elastic or yielding tip or tips 18, which present a smooth bearing for the surface of inner tube 12 at this point, and positively precludes the possibility of any relative movement or play between the tire beads 15, 15 on either side.

Having thus described my invention, what I claim and desire to secure by Letters Patent, is:

1. In a circumferentially divided wheel rim, the combination with separable sections, of a spring locking ring having coöperating inclined faces for drawing and securing said sections together, substantially as described.

2. In a circumferentially divided wheel rim, the combination with separable sections, of an outwardly extending spring locking ring having coöperating inclined faces for drawing and securing said sections together, substantially as described.

3. In a circumferentially divided wheel rim, the combination with separable sections, of a channeled spring locking ring having coöperating inclined faces for drawing said sections together, and means whereby said ring is retained in operative position, substantially as described.

4. In a wheel rim, the combination with relatively fixed and removable sections, of a locking flange upon each of said sections, a non-continuous locking ring having relatively inclined faces for drawing said flanges together, a filler block interposed between the ends of said ring, and means for securing said block, substantially as described.

In testimony whereof I affix my signature, in presence of two subscribing witnesses.

TOD J. MELL.

Witnesses:
W. C. CARMAN,
J. P. FRANCIS.